United States Patent

Hagemeyer, Jr. et al.

[15] 3,671,550
[45] June 20, 1972

[54] HEXAHYDRO-3,3,6,6-TETRA ALKYLFURO(3,2-B)FURAN-2,5-DIOL

[72] Inventors: Hugh J. Hagemeyer, Jr.; Alfred G. Robinson, III, both of Longview, Tex.

[73] Assignee: Eastman Kodak Company, Rochester, N.Y.

[22] Filed: June 10, 1970

[21] Appl. No.: 45,218

[52] U.S. Cl. ............260/347.8, 260/347.4, 260/343.6, 260/635, 260/75
[51] Int. Cl. ............C07d 5/04
[58] Field of Search............260/347.8

[56] References Cited

OTHER PUBLICATIONS

Ali et al., Chem. Abstracts (1958) Vol. 52, 11790C.

Primary Examiner—Alex Mazel
Assistant Examiner—Bernard Dentz
Attorney—Cecil D. Quillen, Jr. and Daniel B. Reece, III

[57] ABSTRACT

Novel bicyclic furofuran-diols having the structure:

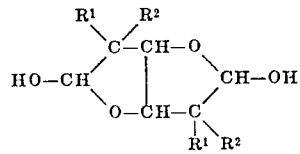

wherein $R^1$ and $R^2$ are the same or different, and each of $R^1$ and $R^2$ are alkyl groups of one to 10 carbons, have been discovered. The compounds are valuable intermediates, for the preparation of polyols, dilactones, simple esters and polyesters.

6 Claims, No Drawings

HEXAHYDRO-3,3,6,6-TETRA ALKYLFURO(3,2-B)FURAN-2,5-DIOL

This invention relates to novel dihydroxy ethers and to a method of preparing the compounds. More particularly, the invention is directed to a novel class of bicyclic furofuran-diol compounds and their preparation.

The bicyclic furofuran-diols of the invention have the following structure:

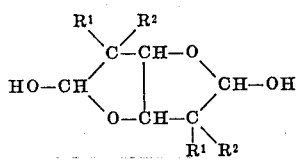

wherein $R^1$ and $R^2$ are the same or different and each of $R^1$ and $R^2$ are alkyl groups of one to 10 carbon atoms and preferably from one to four carbon atoms. The bicyclic furofuran-diol compounds are particularly useful for the preparation of simple esters and polyesters. The compounds of the invention also find use as intermediates in the formation of polyols and dilactones. Polyols are widely used chemicals having utility as humectants and as components of such valuable materials as resinous materials such as polyvinyl chloride compositions. Lactones are known to homopolymerize into useful surface coating materials such as waxes and polishes and to react with difunctional organic compounds such as dihydric alcohols and diamines to form polyesters useful, for instance, as plasticizers.

It has been unexpectedly found that the bicyclic furofuran-diol compounds of the invention may be obtained by the base-catalyzed rearrangement of a bicyclo furodioxole compound having the general structure:

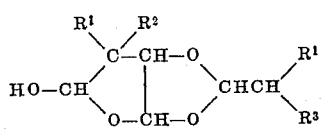

wherein $R^1$ and $R^2$ are as defined above. The rearrangement of furodioxol-ol to furofuran-diols by base catalysis rearrangement reaction of the invention can be illustrated by the following equation:

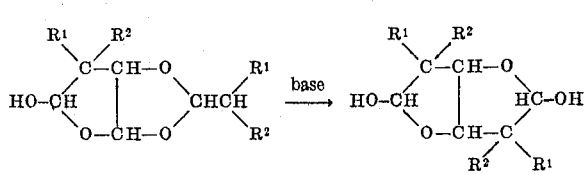

wherein $R^1$ and $R^2$ are as previously defined.

The base-catalyzed rearrangement reaction of the invention may be conducted by merely contacting a suitable base, preferably an alcoholic solution of an alkali metal alkoxide such as sodium methoxide, sodium ethoxide, sodium isobutoxide, potassium methoxide, potassium ethoxide, potassium isobutoxide, etc., with the furodioxol-ol. The reaction proceeds at ambient temperatures but temperatures slightly above or below room temperature may be used, if desired. Ordinarily, the base is added incrementally to the bicyclic furodioxol-ol compound at a temperature in the range of about 0° C. to 35° C., and preferably 5° C. to 15° C. The base is added in an amount sufficient to catalyze the reaction, generally about 0.1 to 15 weight percent, preferably 5 to 10 weight percent based on the weight of alkali metal alkoxide. A stirred reactor is advantageously employed for the reaction to provide more efficient contact between the catalyst solution and the bicyclic furodioxol-ol.

The novel bicyclic furofuran-diols of the invention unexpectedly have been found to exhibit unusual stability toward reagents which ordinarily are known to react with hemiacetals, despite the fact that two hemiacetal linkages are present in the novel compounds. For example, hemiacetals as a class react readily with hydroxylamine to form the corresponding oximes. This reaction is normally carried out at room temperature and is complete within 15 minutes to 2 hours. By contrast, the compounds of the invention are inert to hydroxylamine after an 18 hour reaction time. Exactly the same phenomenon is observed using Tollen's reagent (silver mirror test). As a class, hemiacetals react almost instantaneously. The compounds of the invention, however, fail to form a silver image after an 18 hour period. The unusual stability of the compounds of the invention is dramatically shown by the following comparative data:

| Compound | Reagent | Time required for reaction |
|---|---|---|
| Tetrahydro-2-isopropyl-6,6-dimethylfuro-[2,3-d]-1,3-dioxol-5-ol. | Hydroxylamine | 30 minutes. |
|  | Tollen's reagent | 2 minutes (as evidenced by appearance of silver mirror). |
| Hexahydro-3,3,6,6-tetramethylfuro[3,2-b]furan-2,5-diol. | Hydroxylamine | No reaction in 8 hours. |
|  | Tollen's reagent | No silver mirror in 18 hours. |

The comparative stability shown by the bicyclic furofuran-diol compound could not have been predicted.

The bicyclic furodioxole from which the novel compounds of the invention are formed can be prepared by the reaction of dissimilar aldehydes in the presence of an aqueous base as described in copending U.S. Ser. No. 798,803, filed Feb. 12, 1969 now U.S. Pat. 3,564,017. This reaction can be effected by contacting an aldehyde having a single alpha hydrogen atom and glyoxal in the presence of an aqueous base to form the bicyclic furodioxole starting material and can be illustrated by the following equation:

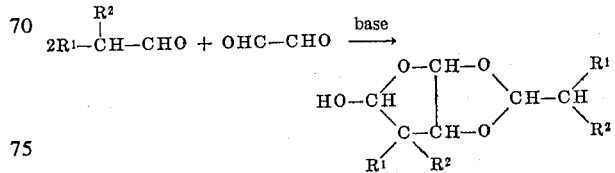

wherein R¹ and R² are as previously defined.

The base-catalyzed condensation of the aldehydes having a single alpha hydrogen atom and glyoxal to form the bicyclic furodioxole starting material according to the process of this invention is effected by contacting an aqueous mixture of the aldehyde and glyoxal in a ratio of at least 2 moles of aldehyde per mole of glyoxal in the presence of an aqueous solution of alkali metal carbonate or alkali metal acetate at a temperature between 10° C. and 50° C. Although not necessary, the reaction is preferably conducted in an inert atmosphere, e.g., nitrogen. Air or oxygen are preferably excluded from the reaction system. The product can be recovered from the reaction mixture by any suitable means such as by vacuum distillation.

Under certain conditions it may be desirable to dissolve the bicyclo furodioxole compound in a suitable solvent such as, for example, ethanol although the use of such a solvent is not necessary. It is also desirable that the base catalyst be neutralized after the reaction has been completed. This can be accomplished by simply adding the appropriate amount of any suitable acid.

Aldehydes suitable for use in preparation of the bicyclic furodioxoles are those having a single alpha hydrogen atom. These aldehydes can be considered as derivatives of acetaldehyde and can be represented by the formula:

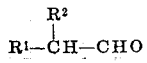

wherein R¹ and R² are the same or different and each of R¹ and R² are alkyl groups of 1 to 10 carbon atoms and preferably one to four carbon atoms. Representative aldehydes include isobutyraldehyde, 2-ethylbutyraldehyde, 2-methylpentaldehyde, and 2-ethylhexaldehyde. Isobutyraldehyde is a preferred reactant, condensing with glyoxal in the presence of the aqueous base according to the following equation to form tetrahydro-2-isopropyl-6,6-dimethylfuro-[2,3-d]-1,3-dioxol-5-ol:

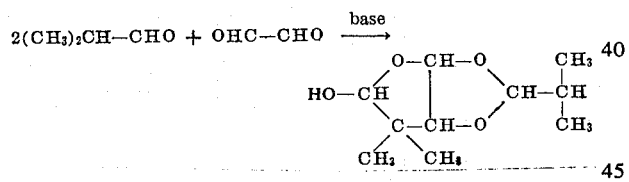

In carrying out the reaction for the preparation of the bicyclic furodioxoles, the aqueous base is usually added incrementally to an aqueous mixture of aldehyde and glyoxal. The reaction is exothermic and can be effected at temperatures between 10° C and 50° C., preferably between 20° C and 45° C. Suitable bases to effect the condensation include any alkali metal carbonate or acetate. The alkali metal carbonates and, in particular, potassium or sodium carbonate, are preferred catalysts. The concentration of the aqueous base is not critical and is generally employed in amounts of from 1 to 15 weight percent, preferably 3 to 8 weight percent, based on total charge. Good results are obtained by employing stoichiometric amounts of aldehyde and glyoxal, i.e., mole ratio of aldehyde:glyoxal of 2:1, although higher ratios can be employed. The reaction is preferably conducted in a stirred reactor to improve contact of the reactants and catalyst solution.

As aforementioned, the novel bicyclic furofuran-diols invention are useful intermediates for the preparation of polyols and dilactones by the following syntheses:

1. Preparation of 2,2,5,5-Tetraalkyl-1,3,4,6-hexanetetrol

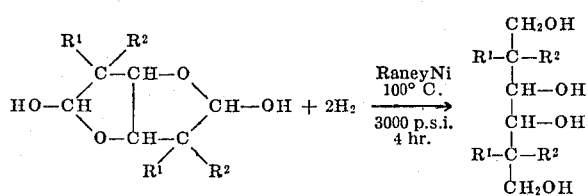

wherein R¹ and R² are as previously defined.

2. Preparation of 3,4-Dihydroxy-2,2,5,5-tetraalkyladipic acid dilactone

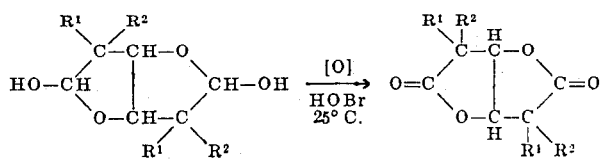

wherein R¹ and R² are as previously defined.

In addition the novel bicyclic furofuran-diols are useful for the preparation of simple and polyesters in accordance with the following reactions:

1. Preparation of Simple Esters

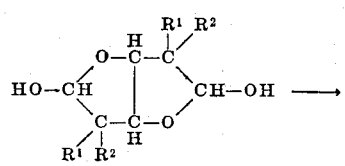

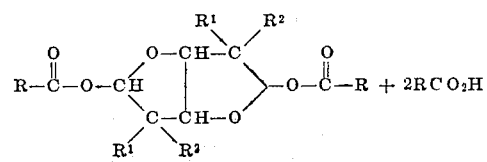

wherein R is a suitable anhydride radical and R¹ and R² are as previously defined.

2. Preparation of Polyesters

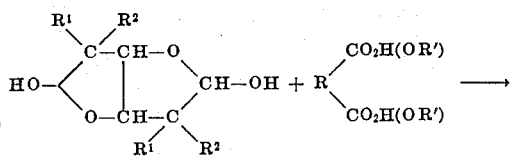

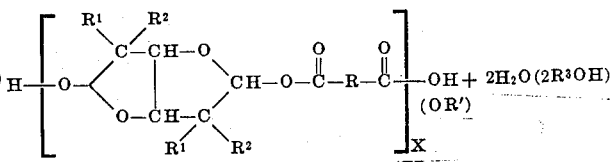

wherein R and R³ are suitable anhydrides and R¹ and R² are as previously defined and wherein X is from 2 to 15.

The invention will be further illustrated by the following examples and it should be understood that the examples are set forth for purposes of illustration only and are not to be construed as limiting the invention in any manner.

EXAMPLE 1

Preparation of Starting Material Tetrahydro-2-Isopropyl-6,6-Dimethylfuro-[2,3-d]-1,3-Dioxol-5-ol To a stirred mixture in a nitrogen atmosphere consisting of 6000 ml. of water, 1800 g. (25 moles) of isobutyraldehyde and 1800 g. (12.4 moles) of glyoxal is added dropwise a solution of 450 g. of potassium carbonate dissolved in 450 g. of water. The time required for addition is 2 hours. As addition proceeds, the temperature increases from 24° C. to a maximum of 42° C. After addition is complete, the mixture is stirred for 4 additional hours. The resulting organic layer is separated from the reaction mixture. After washing once with its own volume of water, the crude product is heated to 50° C. at reduced pressure to remove water and unreacted aldehydes. The weight of isobutyraldehyde recovered is 263 g. The base product solidifies to give a white waxy solid, m.p. 57° C to 59° C. The weight of the product obtained is 2020 g. (10 moles). The product structure assignment as tetrahydro-2-isopropyl-6,6-dimethylfuro-[2,3-d]-1,3-dioxol-5-ol is based on the following analytical data:

| | Analysis | Theory | Found |
|---|---|---|---|
| 1. | Molecular weight | 202 | 213 |
| 2. | Elemental Analyses | | |
| | % Carbon | 59.5 | 59.4 |
| | % Hydrogen | 8.92 | 8.77 |
| 3. | NMR Spectroscopy | Consistent with structure assignment | |
| 4. | IR Spectroscopy | Consistent with structure assignment | |
| 5. | Percent Hydroxyl | 8.4 | 8.5 |

The preparation of the starting material tetrahydro-2-isopropyl-6,6-dimethylfuro-[2,3-d]-1,3-dioxol-5-ol is described in copending U.S. Pat. Application Ser. No. 798,803 filed Feb. 12, 1969, now U.S. Pat. 3,564,017 which is incorporated herein by reference.

EXAMPLE 2

Preparation of Hexahydro-3,3,6,6-Tetramethylfuro[3,2-b]Furan-2,5-Diol

To a stirred mixture consisting of 50 grams (0.247 mole) of tetrahydro-2-isopropyl-6,6-dimethyl-[2,3d]-1,3-dioxol-5-ol prepared as described in Example 1 above, and 100 ml. of absolute ethanol is added dropwise at room temperature 1000 ml. of 0.25N alcoholic sodium ethoxide over a 2-hour period. After addition is complete, the reaction mixture is stirred for 4 additional hours. Sufficient concentrated HCl is added to neutralize the catalyst. Ethanol is removed under reduced pressure and the residue dissolved in 200 ml. acetone. The precipitated salts are separated by filtration. Acetone is removed by heating the filtrate on a steam bath. The resulting brown-red solid is recrystallized from an ether-acetone mixture to give 37.5 grams (75 percent conversion) of hexahydro-3,3,6,6-tetramethylfuro-[3,2-b]furan-2,5-diol, melting point 134 to 135° C. The structure assignment is supported by NMR and infrared spectral analysis, elemental, molecular weight and hydroxyl content analysis.

The invention has been described in considerable detail with particular reference to certain preferred embodiments thereof, but it will be understood that variations and modifications can be effected within the spirit and scope of the invention as described hereinabove.

We claim:

1. A bicyclic furofuran-diol compound having the structure:

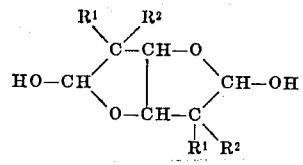

wherein $R^1$ and $R^2$ are the same or different and each of $R^1$ and $R^2$ are alkyl groups of one to four carbon atoms.

2. The compound of claim 1 wherein $R^1$ and $R^2$ are methyl groups.

3. Hexahydro-3,3,6,6-tetramethylfuro[3,2-b]furan-2,5-diol.

4. A method for preparing a bicyclic furofuran-diol having the structure

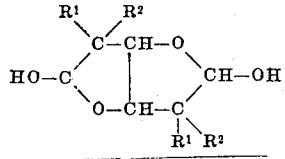

wherein $R^1$ and $R^2$ are the same or different and each of $R^1$ and $R^2$ are alkyl groups of one to four carbon atoms which comprises contacting an alkali metal alkoxide catalyst with a bicyclic fuordioxole compound having the structure:

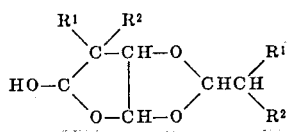

wherein $R^1$ and $R^2$ have the same value as described above.

5. The process of claim 4 wherein the catalyst is sodium ethoxide.

6. The process of claim 5 wherein bicyclic compound contacted is tetrahydro-2-isopropyl-6,6-dimethylfuro[2,3-d]-1,3-dioxol-5-ol.

* * * * *

UNITED STATES PATENT OFFICE
CERTIFICATE OF CORRECTION

Patent No. 3,671,550      Dated June 20, 1972

Inventor(s) Hugh J. Hagemeyer, Jr., and Alfred G. Robinson III

It is certified that error appears in the above-identified patent and that said Letters Patent are hereby corrected as shown below:

Column 1, lines 58-63, the formula should read:

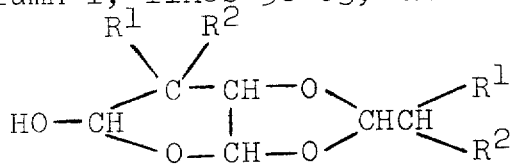

Column 2, lines 35-55, in the table under the heading "Time Required for Reaction", third entry should read ---No reaction in 18 hours---.

Column 2, lines 70-75, the formula should read:

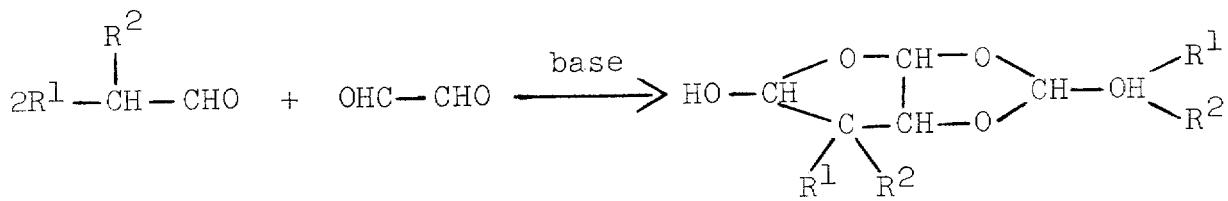

Signed and sealed this 28th day of November 1972.

(SEAL)
Attest:

EDWARD M. FLETCHER, JR.
Attesting Officer

ROBERT GOTTSCHALK
Commissioner of Patents